United States Patent [19]
Tas

[11] Patent Number: 5,703,332
[45] Date of Patent: Dec. 30, 1997

[54] APPARATUS FOR CONVEYING VULNERABLE ARTICLES IN THE ARTICLE HOLDERS

[76] Inventor: Adrianus Wilhelmus Tas, Burgemeester Winkellaan 3, 2631 HG Nootdorp, Netherlands

[21] Appl. No.: 489,935

[22] Filed: Jun. 13, 1995

[30] Foreign Application Priority Data

Jun. 14, 1994 [NL] Netherlands ............. 9400969

[51] Int. Cl.$^6$ ............. G01G 13/00; G01G 13/02; G01G 19/00; B65G 47/84
[52] U.S. Cl. ............. 177/52; 177/52; 177/119; 177/145; 198/803.9; 198/468.9; 198/468.6
[58] Field of Search ............. 177/145, 119, 177/52; 198/468.6, 468.9, 803.9; 209/646, 659, 923

[56] References Cited

U.S. PATENT DOCUMENTS 3,370,691 2/1968 Mosterd .
4,488,635 12/1984 Linville ............. 198/504
4,488,637 12/1984 Loeffler ............. 198/653

FOREIGN PATENT DOCUMENTS 2324382 4/1977 France .
2332208 6/1977 France .
313356 7/1919 Germany .

*Primary Examiner*—Michael L. Gellner
*Assistant Examiner*—Anh Mai
*Attorney, Agent, or Firm*—Griffin, Butler, Whisenhunt & Kurtossy

[57] ABSTRACT

An apparatus comprising a conveyor (1) having article holders for conveying vulnerable articles (V), such as for instance fruits, in the article holders (2), the artices (V) during conveyance being subjected to a treatment for the purpose of the classification of the products, such as for instance a weighing treatment, the article holders being grippers (2) adapted to assume two stable positions, i.e. a gripping position wherein the articles (V) are grippingly receivable in the gripper, and a release position wherein articles (V) received in the gripper (2) are released in downward direction, the grippers (2) being designed so that in the gripping position articles (V) of different dimensions are receivable therein.

17 Claims, 4 Drawing Sheets

5,703,332

APPARATUS FOR CONVEYING VULNERABLE ARTICLES IN THE ARTICLE HOLDERS

The invention relates to an apparatus according to the preamble of claim 1.

Such an apparatus is known from EP-A-0 540 126. The known apparatus is intended for weighing and, on the basis thereof, sorting fruits. The fruits are fed on a roller conveyor with each space between two successive rollers having a product lifting element that is connected with one of the adjacent rollers for movement perpendicular to the plane of travel of the roller conveyor. The position of the product lifting element is determined, in the direction perpendicular to the plane of travel, by a guideway follower provided on the product lifting element and cooperating with a stationary guideway of which at least a portion is part of a weighing device. When the guideway follower rolls over the guideway portion that is part of the weighing device, the product lifting element is lifted in upward direction so that the fruits are clear of the roller conveyor and are completely borne by the product lifting element. Hence, the pressure force exerted by the guideway follower on the guideway portion that is part of the weighing device is a measure for the weight of the fruit contained in the product lifting element.

With the known apparatus only products can be processed whose dimensions are substantially equal. Fruits having greatly varying dimensions or different kinds of fruit cannot be processed by the same apparatus and certainly not at the same time. Moreover, only substantially round products can be processed, because a roller conveyor with freely rotating rollers is used. In course of time, dirt accumulates in the carrying forks of the product lifting elements that is weighed along, which has as a consequence that the accurate weighing operation and hence the sorting operation of the apparatus is adversely affected.

An apparatus of the type mentioned in the preamble is also known from EP-A-0 108 445. In this known apparatus, the products to be classified are conveyed in tiltable trays that move over a weighing device during conveyance. In the trays, fruits of different dimensions can be received, yet the pitch distance between the trays is therefore of necessity fairly large. The speed at which the trays can be moved along without the articles rolling out of the trays under the influence of acceleration forces is relatively low. Because of the large pitch distance and the relatively low speed of travel, the capacity of the apparatus is rather limited. Moroever, when the trays are tilted the articles undergo a falling movement that may be damaging to the articles, particularly if these articles are for instance vulnerable fruits.

Therefore, the object of the invention is to provide an apparatus of the type mentioned in the preamble having a greater capacity, with which artices, in particular fruits, of greatly different dimensions and shapes can be processed whilst the chances of contamination of the article carriers are minimized, and with which the falling movements experienced by the articles can moreover be minimized.

To this end, the apparatus according to the invention is characterized by the features of claim 1.

With an apparatus of such design, articles of different dimensions and shapes can be gripped and conveyed and undergo a treatment, such as for instance a weighing treatment, for the purpose of classification of the products. Because the grippers are adapted to release the articles in downward direction, gripper parts are located exclusively next to and above the articles to be conveyed. Thus, the chances of dirt accumulation, which disturbs the treatment, such as for instance a weighing treatment, for the purpose of a classification of the articles, are minimized. Moreover, the distance between the grippers in the conveyor is determined by the maximum size of the articles and hence, this distance can be selected without a margin for, for instance, projecting tray edges and can therefore by kept small. The articles are moreover positively engaged, as is not the case with the known apparatus, so that the speed at which the transport can take place is great. The two last-mentioned advantages have a positive influence on the capacity of the apparatus according to the invention. By means of the grippers, the articles can be further transferred to another conveying apparatus, a package or a like article pick-up element almost without falling movement, which is a significant advantage compared with the two known apparatus.

Further elaborations of the invention are described in the subclaims and will be further explained on the basis of an exemplary embodiment of the apparatus, with reference to the accompanying drawings. In these drawings:

Figure 1:
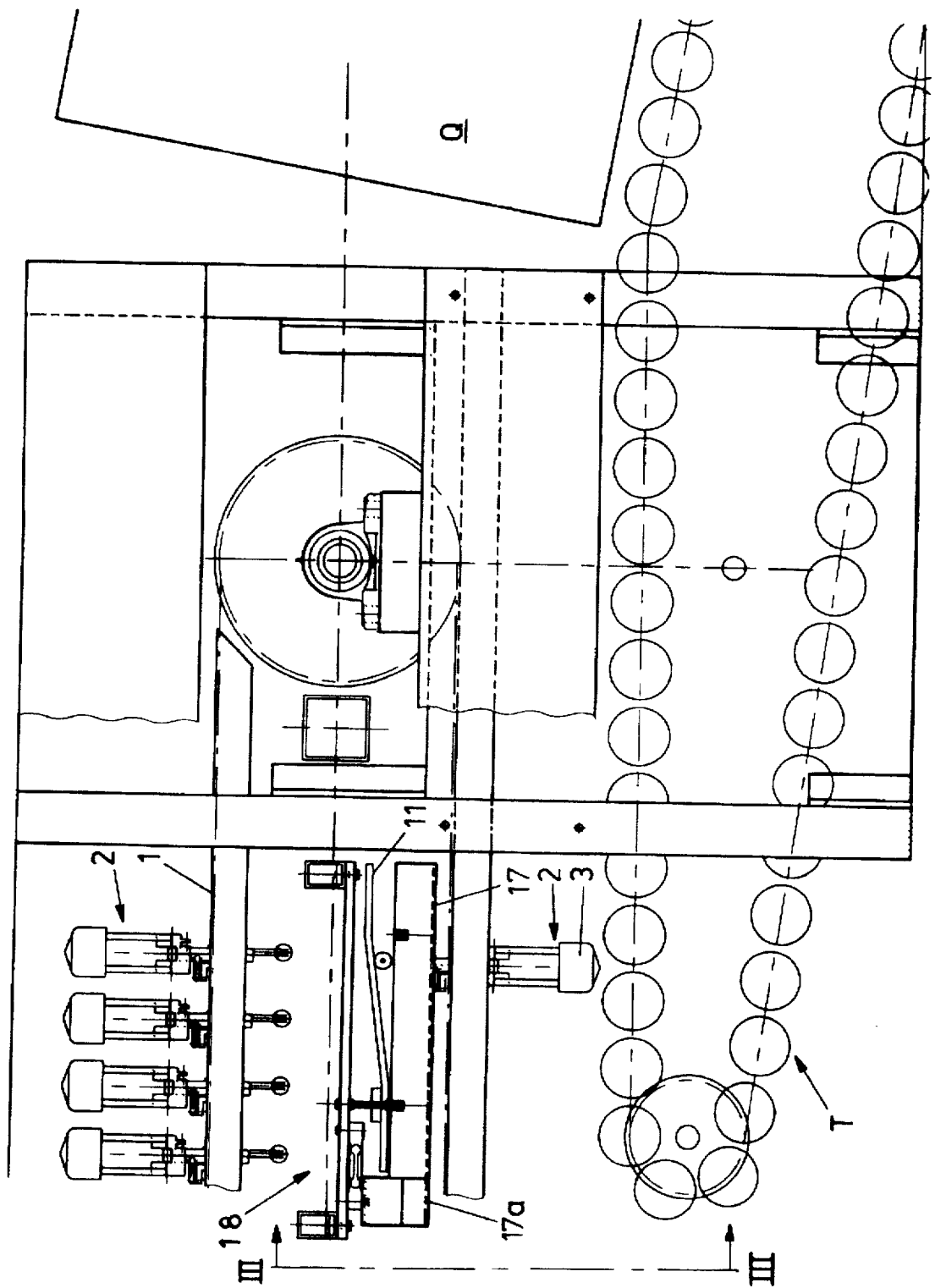
FIG. 1 shows a side elevation of an exemplary embodiment of the apparatus according to the invention.

The exemplary embodiment shown relates to an apparatus for weighing fruits V and for classifying the fruits V on the basis of the weight measured. The fruits V are fed on for instance a roller conveyor T, feeding the fruits V from for instance an apparatus Q for determining the color or quality of the fruits V. The apparatus according to the present invention comprises a conveyor 1 having article holders 2, the article holders 2 being designed as grippers 2. The grippers are adapted to assume two stable positions, i.e. a gripping position wherein the articles V are grippingly receivable in the gripper 2, and a release position wherein articles V received in the gripper 2 are released in downward direction. The grippers 2 are designed so that in the gripping position, articles V of different dimensions can be received therein.

In the present exemplary embodiment, this is realized in that the grippers 2 each comprise two gripper blades 3, having a certain length and extent of flexibility. Due to the length and the flexibility of the gripper blades 3, articles V of different dimensions can be received therebetween in the gripping position of the gripper 2. Because of the flexibility of the gripper blades 3, the mechanism by means of which the position of the gripper 2 is controlled can be of a simple construction as it need only be arranged to impose two positions, i.e. the release position and the gripping position.

The flexibility and the length of the gripper blades 3 are preferably so chosen that the ratio between the diameter of the smallest and the largest article V receivable in the gripping position is at least one to four. This enables for instance fruits of 3.5 to 14 cm to be received in the gripper 2. Moreover, it is not required that the fruits V to be picked up be round. Non-round fruits V, such as for instance pears, can also be picked up by the grippers.

Figure 2:
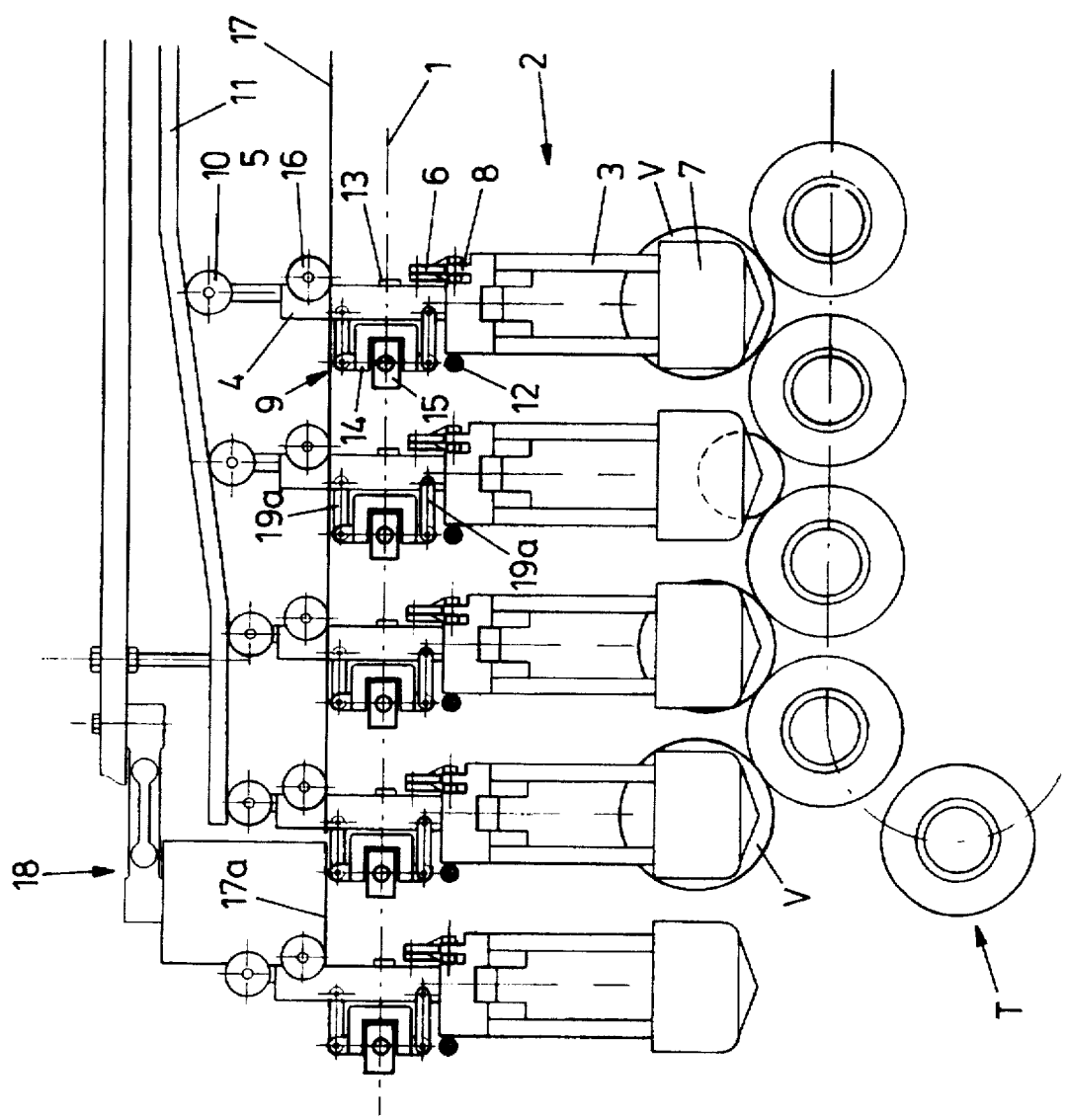
FIG. 2 shows a detail of the view given in FIG. 1.
Figure 3:
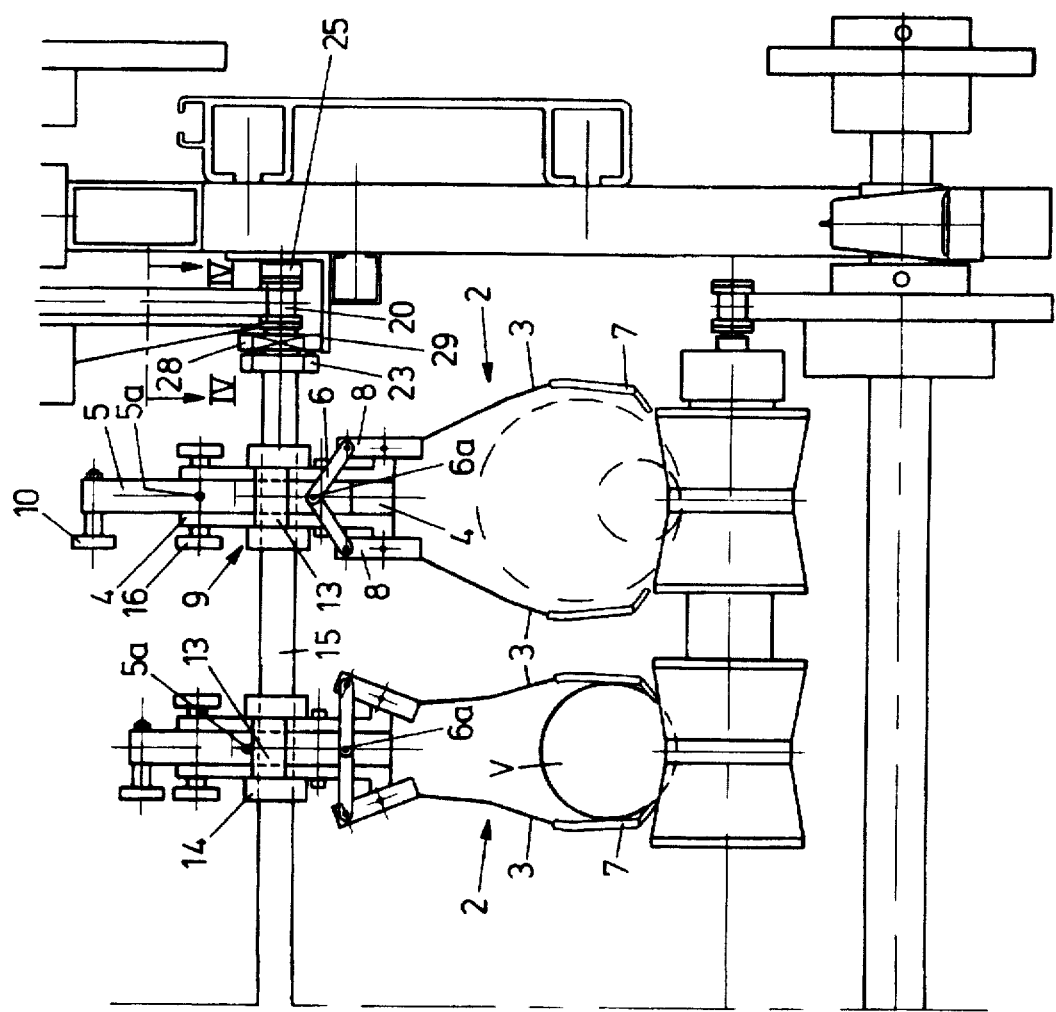
FIG. 3 shows a view from line III—III in FIG. 1.

As is clearly shown in FIGS. 2 and 3, in the present exemplary embodiment, each gripper 2 comprises two gripper blades 3 pivoted to a body 4 extending in a principal direction. The body 4 comprises a control bar 5, connected with the body 4 for displacement in the principal direction.

Via a toggle system 6, the control bar 5 is connected with ends 8 of the gripper blades 3 remote from the gripper blade outer ends 7. The position of the gripper blades 3 is controllable via the toggle system 6 by the control bar 5. The body 4 of the gripper 2 is connected, via a connecting assembly 9, with the conveyor 1. The control bar 5 comprises a guideway follower 10, arranged for cooperation with a stationary first guideway 11 for controlling the position of the gripper 2, depending on the position of the gripper 2 along its path of travel. In the exemplary embodiment shown, the control bar 5 is slidably accommodated in a slot in the body 4. With a gripper 2 of such design, the opening and closing of the gripper blades 3 can readily be controlled through relative movement of the control bar 5 relative to the body 4. This relative movement is imposed by a guideway 11 along which the guideway follower 10 moves, which guideway follower 10 is designed as a guide wheel 10 in the exemplary embodiment.

In accordance with a further elaboration, the gripper blades 3 are biased in the gripping position by a spring 12 that engages with the ends 8 of the gripper blades 3 remote from the gripper blade outer ends 7. When the gripper 2 moves from the gripping position to the release position, the toggle system 6 moves through a dead center, which is clearly visible in FIG. 3. The movement of the control bar 5 in the principal direction of the body 4 is bounded on both sides of the dead center of the toggle system 6 by a stop 13 connected with the body 4. When the gripper is in its closed position, the stop 13 cooperates with a stop 5a on the control bar and when the gripper is in its open position it cooperates with the central shaft 6a of the toggle system 6. It is understood that it is also possible for the body 4 to have two stops provided thereon, each stop cooperating with a stop that is especially provided for that purpose on the control bar 5. However, in order to obtain two stable gripper positions, i.e. a gripping position and a release position, it is important that the toggle system 6, when moving from one position of the gripper 2 to the other position thereof, moves through a dead center.

In the present exemplary embodiment, the treatment to which the fruits V are subjected during conveyance is a weighing treatment. To effect an accurate weighing, the connecting assembly 9 is designed as a connecting piece 14, connected with the body 4 for movement in the principal direction of the body 4, which connecting piece 14 is connected with the conveyor 1 via a transverse rod 15 that extends substantially perpendicularly to the direction of travel of the conveyor 1 and the principal direction of the body 4. The body 4 further comprises a guideway follower 16, arranged for cooperation with a stationary second guideway 17 for controlling the position of the control bar relative to the body 4 and accordingly for controlling the position of the gripper 2. When a weighing operation of the fruit V is to take place, the guideway follower 16 travels over a partial track 17a of the second guideway 17. The partial track 17a forms part of a weighing device 18 by means of which the weight of the gripper 2 and the fruit V that may be present in the gripper can be determined. When the weighing operation takes place, the guideway follower 16 travels over the partial track 17a of the weighing device. The guideway follower 10 connected with the control bar 5 then runs clear, so that no forces are exerted on the gripper 2 by the first guideway 11. The connection between the body 4 and the connecting piece 14, movable in the principal direction of the body 4, is preferably formed by at least two parallel rods 19a, 19b whose outer ends are connected on the one hand with the body 4 and on the other with the connecting piece 14. The partial track 17a of the second guideway 17 is preferably located at a height such that, when the guideway follower 16 of the body 4 moves over it, the parallel rods 19a, 19b have assumed a substantially horizontal position. As a result, the conveying forces exerted on the gripper 2 by the transverse rod 15 have no component in the vertical direction, so that the weighing operation is not influenced by these conveying forces. The parallel rods 19a, 19b moreover constitute a connection permitting a virtually frictionless movement between the body 4 and the connecting piece 14. Because of the absence of friction between the connecting piece 14 and the body 4, the accuracy of the weighing operation cannot be adversely affected thereby either.

Because the apparatus is in some cases only used for smaller fruits, the distance between the grippers 2, viewed in the direction of travel of the conveyor 1, can sometimes be smaller than in the case where large fruits should be processed by the apparatus as well. This means that the distance between the successive transverse rods 15 in the conveyor 1 need not be equal for each apparatus to be delivered. However, from points of view of manufacturing technique, it is favorable if the parts from which the apparatus is manufactured are standart parts that can be applied both to an apparatus whose grippers 2 are mounted with a larger distance relative to each other and to an apparatus whose grippers 2 are mounted with a smaller distance relative to each other.

Figure 4:
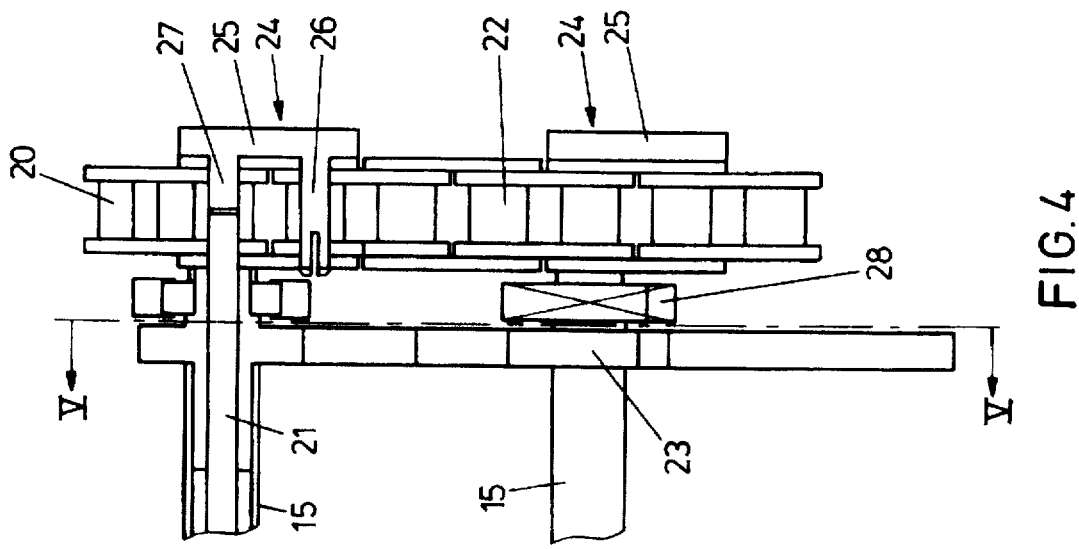
FIG. 4 shows a view from line IV—IV in FIG. 3.

To this end, in accordance with a further elaboration of the invention, the apparatus is characterized in that the conveyor 1 is designed as two parallel, endless hollow hinge bolt chains 20 with the transverse rods 15, of hollow design, extending therebetween. On each transverse rod 15 at least one gripper is mounted and each hollow transverse rod contains a mounting pin 21 having its ends 21a accommodated in the hollow hinge bolts 22 of the chains 20 of the conveyor 1. With an apparatus of such design, the mounting pins 21 can be accommodated in hinge bolts 22 of the chains 20 in closely spaced or more widely spaced relation, depending on the size of the fruits, so that the distance between the grippers 2, viewed in the direction of travel of the conveyor 1, can be varied. It is even possible to carry out such variation when the user of the apparatus changes to products having larger or smaller dimensions. As is clearly shown in FIG. 2, the transverse rods 15 have a substantially rectangular cross-sectional profile at least through a part of the length thereof, which profile can fittingly be received in a rectangular recess 14 of the gripper 2. Hence, the rotative position of the transverse rod 15 about the longitudinal center line of the transverse rod 15 determines the direction in which the principal direction of the body 4 of the gripper 2 extends. To prevent the grippers 2 from touching each other by the gripper blade outer ends 7, it is important that the principal directions of the bodies 4 of juxtaposed grippers 2 do not differ too much from each other. For this purpose, the transverse rods 15 comprise a fork 23 cooperating with a preceding or following transverse rod 15 and determining the position of the transverse rod 15 in rotative sense around its longitudinal center line. This is clearly shown in FIGS. 4–6. It can thus be provided that the principal direction of the body 4 of the grippers 2 always has the desired direction throughout the path of travel of the conveyor 1, while the travel of the hollow hinge bolt chains 20 can take place unhindered without rotational forces being exerted on the links.

Figures 5, 6:
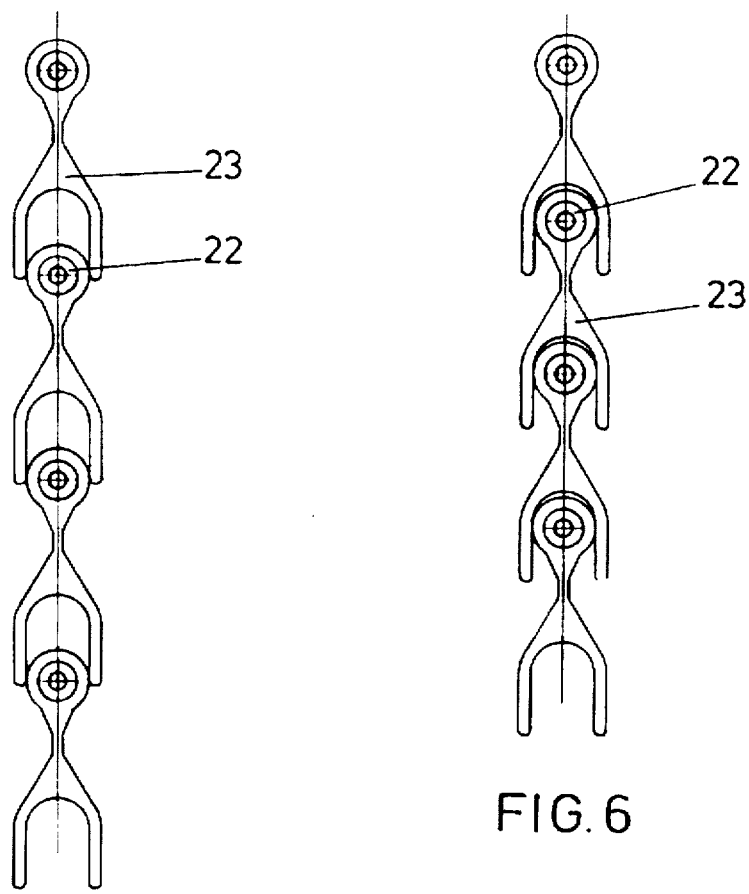
FIG. 5 shows a view from line V—V in FIG. 4, the distance between the transverse rods being maximal.
FIG. 6 is a similar view as given in FIG. 5, the distance between the transverse rods being minimal.

FIGS. 5 and 6 show in side view the forks 23 respectively in a condition wherein the transverse rods 15 are spaced apart a maximum distance and a condition wherein the transverse rods 15 are spaced apart a minimum distance. This variation possibility is present by virtue of the length of the fork legs 22a. It is understood that the fork legs 22a cannot be chosen to be too long, because in that case the curves that the conveyor 1 is capable of moving through can only have a very large radius.

In accordance with a further elaboration of the invention, to prevent the mounting pins 21 from shifting in the longitudinal direction as a consequence of which the transverse rods 15 might slip out of the conveyor 1, the mounting pin 21 is fixed in longitudinal direction by end stops 24 mountable in the hollow hing bolt chain 20. The end stops 24 comprise a body 25 and a locking pin 26 and stop pin 27 fixedly connected therewith. In mounted condition of the end stop 24, the stop pin 27 extends in the hollow hinge bolt 22 wherein the mounting pin 21 to be fixed is located, and the locking pin 26 extends in an adjacent hollow hinge bolt 22 of the chain 20. Such end stops 24 can readily be mounted in the hing bolt chains 20 and can be removed and displaced afterwards, if desired. Thus, it is possible to vary the position of the transverse rods 15 in the chains 20 afterwards.

Figure 7:
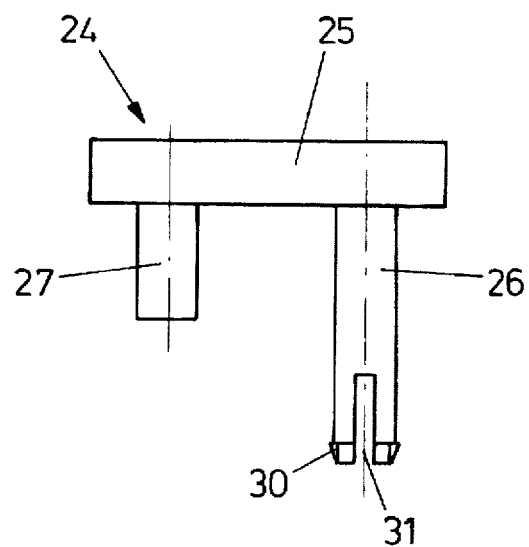
FIG. 7 shows in detail the end stop shown in FIG. 4.

FIG. 7 shows in detail the end stop 24. As is clearly visible, the locking pin 26 of the end stop 24 has its outer end provided with a thickening 30 and a slot 31 so that the outer end of the locking pin is compressible. The length of the locking pin 26 excluding the thickening 30 corresponds to the length of the hollow hinge bolts 22 of the chain 20. When the end stop 24 is inserted into the hollow hinge bolt chains 20, the outer end of the locking pin 26 is compressed enabling the thickening 30 to move through the hollow hinge bolt 22 wherein it is received. If the end stop 24 has been inserted, the thickening 30 has slid through the hollow hinge bolt 22 completely and is again in the expanded condition behind the edge of the hollow hinge bolt 22. In this manner, the end stop is fixed in the chain 20 and can only be removed through compression of the locking pin near the thickening 30. As is clearly visible in FIG. 3, the body 25 of the end stop 24 also serves as lateral guide of the chain 20.

In order to support the transverse rods in vertical direction and to subject the conveyor 1 only to conveying forces and not also to supporting forces for the grippers 2, the transverse rods 15, near the ends thereof, are provided with support bearings 28 that cooperate with a support track 29. In this manner, the transverse rods 15 are guided both in vertical direction by the support bearings 28 and in transverse direction by the bodies 25 of the end stops 24, and the path travelled by the transverse rods 25 is completely defined.

It is understood that the invention is not limited to the exemplary embodiment described, but that various modifications are possible within the purview of the invention.

I claim:

1. An apparatus comprising a conveyor (1) having article holders for conveying vulnerable articles (V), such as for instance fruits, in the article holders (2) along a path of travel, wherein the article holders are grippers (2) adapted to assume two stable positions, i.e. a gripping position wherein the articles (V) are grippingly receivable in the gripper (2), and a release position wherein articles (V) received in the gripper (2) are released in a downward direction, the grippers (2) being designed so that in the gripping position articles (V) of different dimensions are receivable therein:
   wherein each gripper (2) comprises at least two gripper blades (3) wherebetween the articles (V) are grippingly receivable in the gripping position, the gripper blades (3) having a certain length and a degree of flexibility for the purpose of receiving articles (V) of different dimensions in the gripping position;
   and wherein the length and extent of flexibility of the gripper blades (3) are so chosen that the ratio between the diameter of the smallest and the largest article (V) receivable in the gripping position is at least 1 to 4.

2. An apparatus according to claim 1, wherein the conveyor (1) is designed as two parallel, endless hollow hinge bolt chains (20) with hollow transverse rods (15) extending therebetween, at least one gripper (2) being mounted on each transverse rod (15), each hollow transverse rod (15) containing a mounting pin (21) having its outer ends accommodated in hollow hinge bolts (22) of the chains (20).

3. An apparatus according to claim 2, wherein each transverse rod (15) comprises a fork (23) cooperating with at least one of a preceding and following transverse rod (15) and determining the position of the transverse rod (15) in rotative sense around longitudinal center line thereof.

4. An apparatus according to claim 2, wherein the mounting pin (21) is fixed in longitudinal direction by end stops (24) that are received in the hollow hinge bolt chain (20) and comprise a body (25) and, fixedly connected therewith, a locking pin (26) and stop pin (27), the stop pin (27) in mounted condition of the end stop (24) extending in the hollow hinge bolt (22) wherein the mounting pin (21) to be fixed is located, and the locking pin (26) extending in an adjacent hollow hinge bolt (22) of the chain (20).

5. An apparatus according to claim 4, wherein the locking pin (26) of the end stop (24) has its outer end provided with a thickening (30) and a slot (31) so that the outer end is compressible, the length of the locking pin (26) excluding the thickening (30) corresponding to the length of the hollow hinge bolts (22) of the chain (20).

6. An apparatus according to claim 2, wherein each transverse rod (15) comprises, near its outer ends, a support bearer (28) cooperating with a support track (29).

7. An apparatus comprising a conveyor having article holders for conveying vulnerable articles, such as for instance fruits, in the article holders along a path of travel, wherein the article holders are grippers adapted to assume two stable positions, i.e. a gripping position wherein the articles are grippingly receivable in the gripper, and a release position wherein articles received in the gripper are released in a downward direction, the grippers being designed so that in the gripping position articles of different dimensions are receivable therein;
   wherein there are two gripper blades pivoted to a body extending in a principal direction and a control bar for displacement in the principal direction, said control bar being connected via a toggle system with ends of the gripper blades that are remote from gripper blade outer ends, the position of the gripper blades being controllable by the control bar via the toggle system, the body being connected via a connecting assembly with the conveyor, and the control bar comprising a guideway follower arranged for cooperation with a stationary first guideway for controlling the position of the gripper, depending on the position of the gripper along the path of travel.

8. An apparatus according to claim 7, wherein the gripper blades (3) are biased in one of the positions by a spring (12), the toggle system (6) moving through a dead center when the gripper (2) moves from the gripping position to the release position.

9. An apparatus according to claim 8, wherein the movement of the control bar (5) relative to the body (4) is limited by a stop (13) on both sides of the dead center of the toggle system (6).

10. An apparatus according to claim 7, wherein the connecting assembly (9) has a connecting piece (14) connected with the body (4) for movement in the principal direction of the body (4), said connecting piece (14) being connected, via a transverse rod (15) extending approximately perpendicularly to the direction of travel of the conveyor (1) and the principal direction of the body (4), with the conveyor (1), the body (4) comprising a guideway follower (16) for cooperating with a stationary second guideway (17) for controlling the position of the control bar (5) relative to the body (4) and accordingly for controlling the position of the gripper (2).

11. An apparatus according to claim 10, wherein a partial track (17a) of the second guideway (17) forms a part of a weighing device (18) by means of which the weight of the gripper (2) and the article (V) that may be present in the gripper can be determined.

12. An apparatus according to claim 10, wherein a connection, movable in the principal direction of the body (4), between the body (4) and the connecting piece (14) is formed of at least two parallel rods (19a, 19b) whose outer ends are connected with the body (4) on the one hand and with the connecting piece (14) on the other.

13. An apparatus according to claim 7, wherein the conveyor is designed as two parallel, endless hollow hinge bolt chains with hollow transverse rods extending therebetween, at least one gripper being mounted on each transverse rod, each hollow transverse rod containing a mounting pin having its outer ends accommodated in the hollow hinge bolts of the chains.

14. An apparatus according to claim 13, wherein each transverse rod comprises a fork cooperating with at least one of a preceding and following transverse rod and determining the position of the transverse rod in rotative sense around a longitudinal center line thereof.

15. An apparatus according to claim 13, wherein the mounting pin is fixed in longitudinal direction by end stops that are received in the hollow hinge bolt chain and comprise a body and, fixedly connected therewith, a locking pin and stop pin, the stop pin in mounted condition of the end stop extending in the hollow hinge bolt wherein the mounting pin to be fixed is located, and the locking pin extending in an adjacent hollow hinge bolt of the chain.

16. An apparatus according to claim 15, wherein the locking pin of the end stop has its outer end provided with a thickening and a slot so that the outer end is compressible, the length of the locking pin excluding the thickening corresponding to the length of the hollow hinge bolts of the chain.

17. An apparatus according to claim 13, wherein each transverse rod comprises, near its outer ends, a support bearer cooperating with a support track.

* * * * *